United States Patent

Flessas

[11] Patent Number: 5,345,813
[45] Date of Patent: Sep. 13, 1994

[54] PRESSURE TESTABLE FLEXIBLE PIPING PENETRATION

[75] Inventor: Dean Flessas, Lombard, Ill.

[73] Assignee: Buffalo Environmental Products Corporation, Oak Brook, Ill.

[21] Appl. No.: 167,630

[22] Filed: Dec. 14, 1993

Related U.S. Application Data

[63] Continuation of Ser. No. 33,390, Mar. 19, 1993, abandoned.

[51] Int. Cl.⁵ .............................................. G01M 3/28
[52] U.S. Cl. ........................................ 73/46; 73/49.8
[58] Field of Search ............... 73/46, 49.8, 40, 40.5 R; 277/2

[56] References Cited

U.S. PATENT DOCUMENTS

| | | |
|---|---|---|
| 2,342,616 | 2/1944 | O'Brien . |
| 2,477,334 | 7/1949 | Hibner et al. . |
| 3,043,129 | 7/1962 | King ........................................ 73/40 |
| 4,291,905 | 9/1981 | Schrock . |
| 4,741,199 | 5/1988 | Spencer ................................... 73/46 |
| 4,805,444 | 2/1989 | Webb ............................... 73/40.5 R |
| 4,932,257 | 6/1990 | Webb ............................... 73/40.5 R |
| 5,040,408 | 8/1991 | Webb ............................... 73/40.5 R |
| 5,140,848 | 8/1992 | Spencer ................................... 73/46 |

FOREIGN PATENT DOCUMENTS 100727 6/1993 Japan ..................................... 73/40

*Primary Examiner*—Hezron E. Williams
*Assistant Examiner*—Joseph W. Roskos
*Attorney, Agent, or Firm*—Lockwood, Alex, FitzGibbon & Cummings

[57] ABSTRACT

A pressure testable flexible entry boot that provides sealed piping penetration through a container wall including a first elastomeric boot which cooperates with a second elastomeric boot to form a sealed air pocket, which may be pressurized by introducing air through a port extending through one of the elastomeric boots to detect leaks.

12 Claims, 2 Drawing Sheets

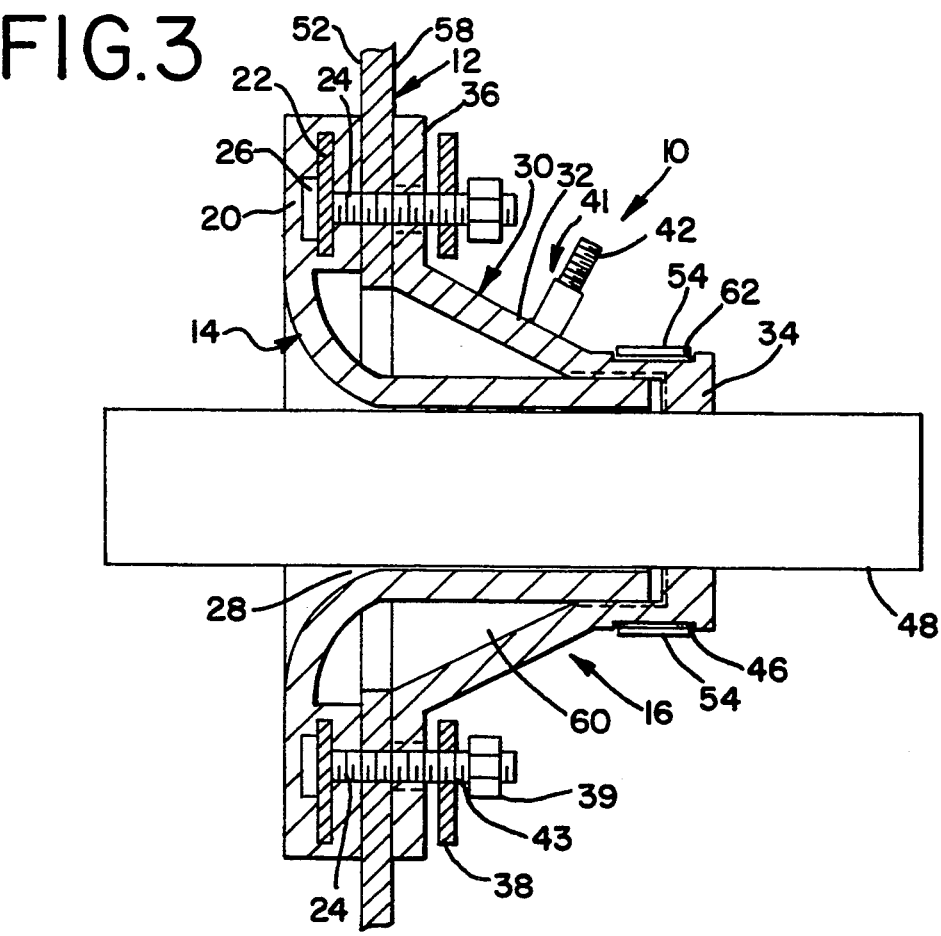
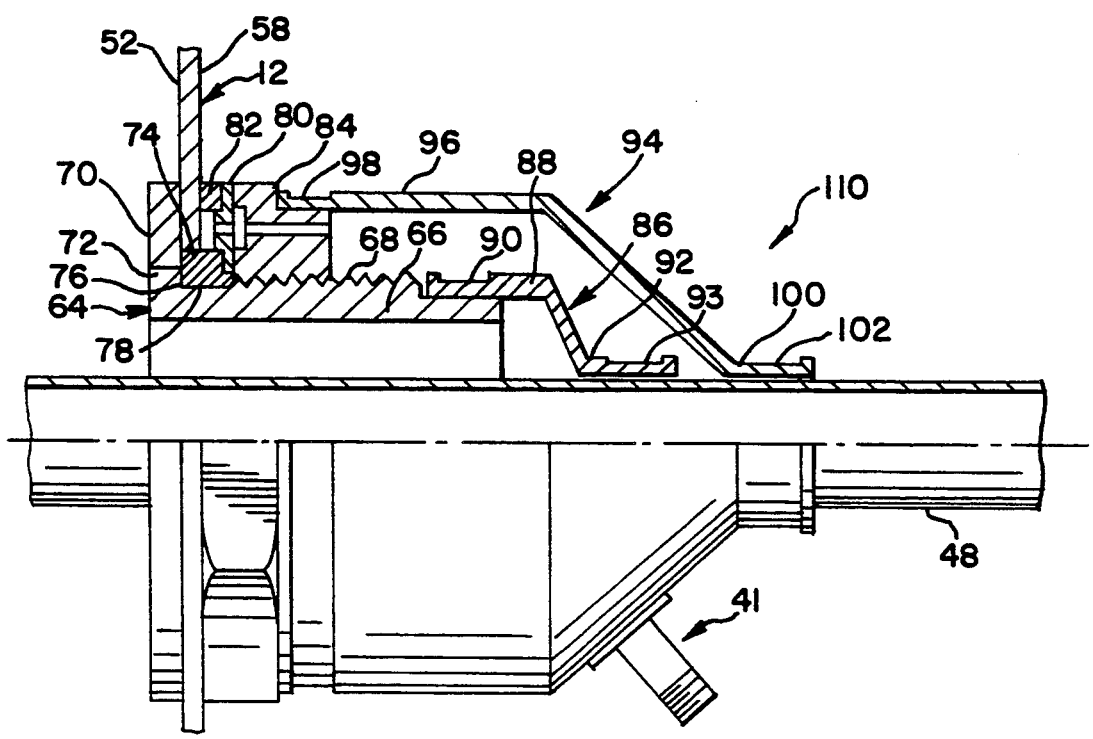

PRESSURE TESTABLE FLEXIBLE PIPING PENETRATION

This application is a continuation of application Ser. No. 08/033,390, filed Mar. 19, 1993, now abandoned.

FIELD OF THE INVENTION

The present invention is directed to an apparatus that provides sealed piping penetrations through the wall of a liquid container. More particularly, the present invention is directed to an apparatus that provides sealed penetrations of piping and conduit through the wall of an underground secondary containment system for chemical and gasoline storage systems and having the ability to pressure test the connection for leaks.

BACKGROUND OF THE INVENTION

Subterranean piping systems of the type that are typically installed at service stations are generally utilized to communicate fuel or chemicals between an underground storage tank and an above ground dispensing station. The underground storage tanks and associated piping pose serious potential environmental and fire hazards as the chemicals contained therein could and have in the past leaked into the earth. To limit these potential hazards, secondary containment systems have been developed which generally operate by providing a second wall or jacket around each of the associated tanks and piping. Thus a leak from a primary tank would be prevented from spilling into the earth by the outer sealed jacket. A similar arrangement utilizing a second pipe of a larger diameter encompassing a primary pipe is designed to prevent leakage from pipes from reaching the soil.

With these new containment systems, several piping penetrations are required into the containment sumps either above the tanks or at the dispensing locations. These locations are therefore leak sensitive and prior art attempts at sealing these penetrations have included the use of grommets, bulkhead fittings and flexible entry boots. These prior art devices proved to be somewhat successful in sealing the penetrations, however, they were all installation sensitive and could not be tested without filling the containment system with water.

Not testing the system is no alternative as improperly sealed connections would allow ground water to infiltrate the system setting off alarms in the secondary system and require undue maintenance. In addition, potential contamination of the soil and ground water could occur through undetected leaks in the piping penetrations. Verifying the integrity of the piping penetrations is crucial to providing a reliable system, and therefore the ability to provide pressure testable piping penetrations is a significant advantage of the present invention.

SUMMARY OF THE INVENTION

The pressure testable flexible boot of the present invention overcomes the problems associated with the prior art and is adapted to provide a flexible and pressure testable piping penetration through the wall of a liquid container. The present invention includes a first elastomeric boot having a flange portion adapted to engage the outside of a containment wall and a body portion adapted to extend through an opening in the containment wall. The present invention is provided with a second elastomeric boot adapted to overlap the body portion of the first elastomeric boot and form a sealed area on the inside of the containment wall between the first and second boots. In addition, a test port is provided that extends through the second elastomeric boot to provide a pathway for introducing air to pressurize and monitor the sealed area.

It is therefore an object of the present invention to provide an improved flexible piping penetration entry boot.

It is another object of the present invention to provide a flexible piping penetration boot formed from a pair of cooperating elastomeric boots adapted to form a sealed area between them.

It is yet a further object to provide a flexible piping penetration boot having a test port to provide a pathway for introducing air to pressurize and monitor the sealed area formed by the cooperating boots.

It is yet a further object of the present invention to provide a pressure testable flexible piping penetration adapted to provide testing and adjustment access to all sealed areas after installation through a containment wall from one side of the containment wall.

BRIEF DESCRIPTION OF THE DRAWINGS

For a more complete understanding of the present invention, reference should now be made to the embodiments illustrated in greater detail in the accompanying drawings and described below by way of example of the invention. It should be understood that the invention is not necessarily limited to the particular embodiments illustrated herein, but is defined by the appended claims.

In the Drawings

FIG. 3 is a side sectioned view illustrating a pressure testable flexible entry boot made according to the present invention assembled to a pipe extending through a containment wall; .

FIG. 4 is a side sectioned view of a pressure testable flexible entry boot assembled to a pipe extending through a containment wall and illustrating a bulkhead fitting.

DETAILED DESCRIPTION OF THE PREFERRED EMBODIMENT

Figure 1:
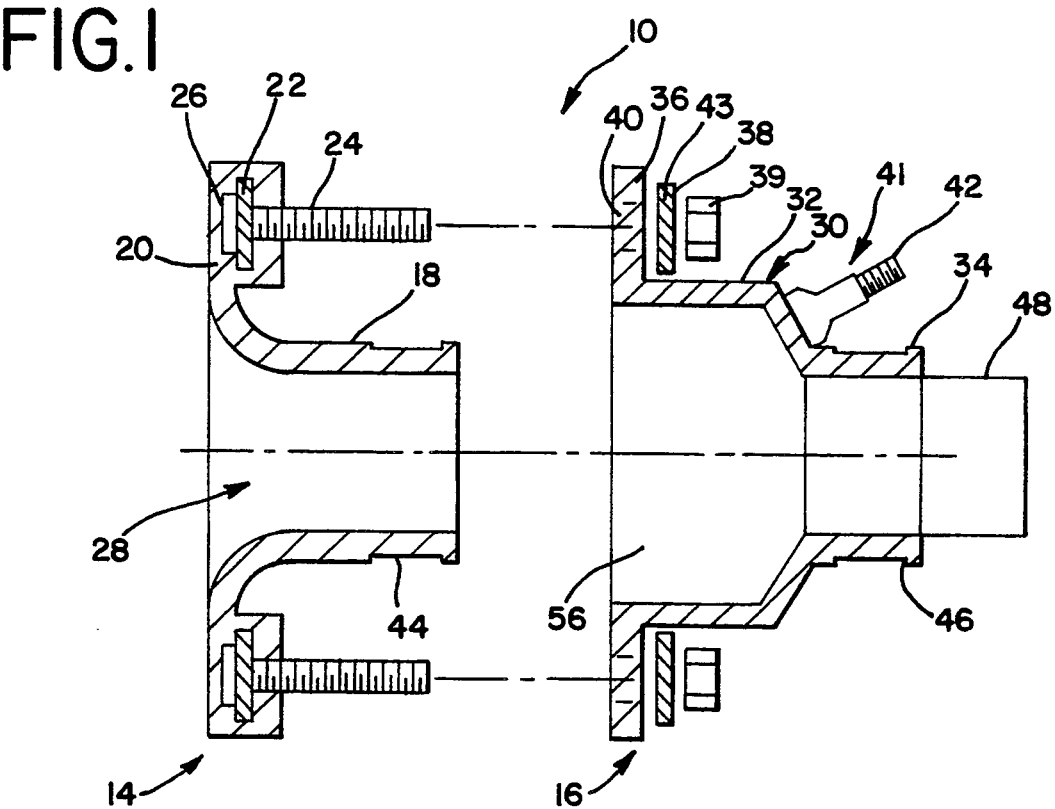
FIG. 1 is a side sectioned view illustrating a pressure testable flexible entry boot made according to the present invention.
Figure 2:
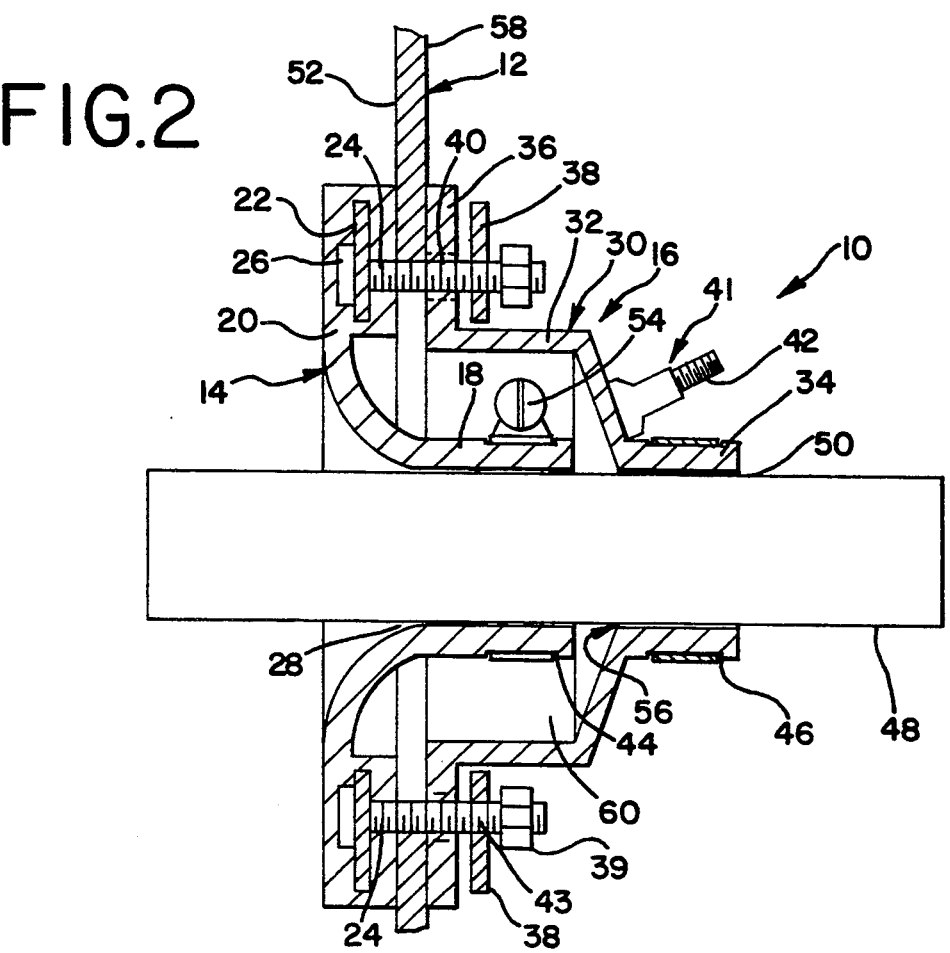
FIG. 2 is a side sectioned view illustrating a pressure testable flexible entry boot made according to the present invention assembled to a pipe extending through a containment wall.

Referring to the drawings in greater detail, a pressure testable flexible entry boot generally designated 10 is shown in FIG. 2 attached to a containment wall 12. As shown more clearly in FIG. 1, the pressure testable flexible entry boot 10 includes an outer boot 14 and inner boot 16. It is preferred that boots 14 and 16 be made of an elastomeric material that is flexible yet sturdy enough to withstand burial and resistance to corrosion from chemicals and fuels as well as mildew and fungus attack. One such material meeting these specifications is melt processable rubber made by DuPont and sold under the name ALCRYN ®. While the invention may be embodied in a variety of forms and used in different applications, description of one preferred embodiment of the inventive concept will be made wherein the invention is utilized to provide a pressure testable piping penetration fitting through the containment wall of a secondary containment system.

Referring to the drawings in more detail, the outer boot 14 includes a main annular body portion 18 and a round rigid flange 20. The elastomeric round rigid flange 20 is reinforced by a steel ring 22 encapsulated in the elastomeric material. At least four studs 24, spaced equidistance about the steel ring 22 extend perpendicularly through the steel ring 22 and the flange 20. The heads 26 of the studs 24 as well as a small portion of the stud is also encapsulated in the elastomeric material. It should be understood that the quantity of studs may be increased for larger diameter rings to insure proper sealing. In addition, the boot 14 includes a center opening 28 through which a pipe may extend. The outer boot 14 also includes a groove 44 on the main body portion 18 adapted to receive a standard hose clamp 54.

The inner boot 16 includes a main annular body portion 30. The main body portion 30 includes a first section 32 having an inner diameter slightly larger than the outer diameter of the main body portion 18 of the outer boot 14. A second section 34 of the main body portion has an inner diameter substantially equal to the inner diameter of the outer boot 14.

The first section 32 of the main body portion 30 includes an annular flange 36. The flange 36 includes a plurality of holes 40 adapted to receive the studs 24 extending from the outer boot 14 and through the containment wall when the boot 10 is assembled. A steel reinforcing ring 38 is adapted to fit over the main body portion 30 and abut the annular flange 36 in order to hold the flange 36 flush against the containment wall 12 when assembled. The steel reinforcing ring 38 also includes punched holes 43 adapted to line up with the extending studs 24 of the outer boot 14 when the testable flexible entry boot 10 is assembled. Hex nuts 39 are used to threadably engage the studs in order to assemble the testable flexible entry boot 10. The inner boot 16 also includes a groove 46 on the second section 34 of the main body portion 30 adapted to receive a standard hose clamp 54.

A sealable test port 41 of a type well known in the field is disposed on the first section 32 of the inner boot 16 to provide a pathway into the area defined between the inner and outer boots. The test port 41 may be molded as part of the inner boot 16 or be mechanically attached, for example, by a tension or compression fit between the boot 16 and the test port 41. The test port 41 preferably has a threaded portion 42 adapted to connect to a conventional source of pressurized air.

Turning now to FIG. 2, the pressure testable flexible entry boot 10 is shown assembled to a containment wall 12 having the pipe 48 extending therethrough. The containment wall 12 includes an opening slightly larger than the outer diameter of the pipe 48. The containment wall 12 also includes a plurality of equidistantly spaced holes adapted to receive the studs 24 extending from the outer boot 14. A pipe 48 extends through the opening 28 in the outer boot 14 and the opening in the containment wall 12. The outer boot 14 is disposed such that the round flange 20 abuts against the outer surface 52 of the containment wall 12 and the studs 24 extend through the holes in the containment wall. A standard hose clamp 54 is seated and tightened in the groove 44 on the body portion 18 of the outer boot 14 and around the pipe forming an air tight seal between the outer boot 14 and the pipe 48.

The inner elastomeric boot 16 is disposed adjacent the containment wall 12 so that the pipe 48 extends through the inner boots central opening 56. In addition, the first section 32 of the main body portion 30 overlaps and is radially spaced from the main body portion 18 of the outer boot 14. The annular flange 36 of the inner elastomeric boot 14 is disposed abutting the inner surface 58 of the containment wall 12 and arranged so that the studs 24 extend through the holes 40 in the flange 36. The steel reinforcing ring 38 is arranged to abut the flange 36 and allow the studs 24 to extend through the holes 43 in the ring 38. Nuts 39 are threadably tightened on studs 24 to seal the flange 36 against the inner surface 58 of the containment wall 12 and to seal flange 20 against the outer surface 52 of the containment wall.

The second section 34 of the main body portion 30 of inner boot 16 is sealed against the outer diameter of the pipe 48 by a standard hose clamp 54 positioned in groove 46. In its assembled form, an air pocket 60 is created in the boot 10 in the area between the inner and outer boots.

An air source may be attached to the test port 41 to pressurize the system with air to test for leaks. It should be noted that all of the points where the inner and outer boots are sealed against the pipe or the containment wall can be tested from the test port 41 and all seal areas can be tightened or adjusted from the inside area of the containment wall 12. This is especially advantageous when, for example, the pressure testable flexible entry boot 10 is utilized on a sump where the pipe is already installed or buried. As long as one has access to the interior of the sump, the system can be tested for leaks and the seal areas tightened. In addition, the flexible elastomeric boots allow for sealing a pipe connection on a cylindrical wall, such as for example, a cylindrical tank, as well as piping penetrations where the pipe is not maintained precisely perpendicular to the containment wall. The latter occurs quite frequently after installation due to settling of the earth which causes shifting of the buried system.

In an alternative embodiment illustrated in FIG. 3, the pressure testable flexible entry boot 10 may be assembled with a single standard hose clamp 54. In this embodiment, the main body portion 18 of the outer flexible boot 14 is extended so that the second section 34 of the main body portion 30 of the inner boot 16 overlaps that portion of the outer boot 14. A single groove 62 on the inner boot 14 adapted to accept a standard hose clamp 54 which is utilized to seal both the inner and outer boots to the outer diameter of the pipe.

Another embodiment of the present invention is illustrated in FIG. 4. A pressure testable flexible entry boot 110 is shown assembled on a containment wall 12. In this embodiment, a bulkhead fitting 64 preferably made of a hard plastic such as Delrin is inserted through an opening in the containment wall 12 and around a pipe 48 extending therethrough. The bulkhead 64 included an annular body portion 66 having threads 68 on a portion of its outside diameter and an annular flange 70 adapted to engage the outside surface 52 of the containment wall 12. A first elastomeric gasket 72 is provided that extends annularly in the area defined by the circular edge 74 of the opening in the containment wall, the inner surface 76 of the flange 70, and the outer surface 78 of the body portion of the bulkhead 64. A ring washer 80 is disposed about the body portion of the bulkhead 64 and a second gasket 82 is provided between the washer 80 and the inner surface 58 of the containment wall.

A lock nut 84 preferably made of Delrin to resist corrosion, engages the threaded portion of the bulkhead 64 to form a seal between the bulkhead and the containment wall 12. The nut 84 pushes the washer 80 against the second gasket 82 to assist in forming the seal. The washer 80 also compresses the first gasket 72 which causes it to expand radially thereby sealing against the outer surface 78 of the body portion of the bulkhead 64 and the circular edge 74 forming the opening in the containment wall 12.

An inner elastomeric boot 86 is positioned around the pipe so that a portion 88 of the boot overlaps the outer surface 78 of the body portion of the bulkhead 64. The portion 88 of the boot 86 overlapping the bulkhead 64 includes a groove 90 adapted to receive a standard hose clamp 54 for sealing the boot 86 to the bulkhead 64. It should be understood that the entire body portion of the bulkhead is not threaded so that a smooth surface is available for the boot 86 to form an airtight seal against the bulkhead 64. Alternatively, the boot 86 may be molded as part of the bulkhead removing the need for the standard hose clamp 54. A second portion 92 of the boot 86, also having a groove 93 engages the outer surface of the pipe and utilizes a standard hose clamp 54 to seal the boot 86 to the pipe.

An outer elastomeric boot 94 is disposed about the pipe and includes a first body section 96 overlapping and radially spaced from the first boot 86 and the bulkhead 64. The first body section 96 also overlaps and engages the outer surface of the lock nut 84 and is sealingly affixed thereto by a standard hose clamp 54 that rides in a groove 98 formed in the outer boot 94. A second body portion 100 of the outer boot 94 engages the outer surface of the pipe and is affixed thereto by a standard hose clamp 54 riding in groove 102 formed in the outer boot 94. A test port 41 is disposed on the first body section 96 of the outer elastomeric boot 94 to allow air to be introduced into the area between the inner and outer boots to test for air leaks. The seals formed by the pressure testable flexible boot are tested by introducing air through the test port 41 to pressurize the system and determine if the boot holds the pressure. To test for leaks prior to burial of the system, air may be introduced and a soapy water solution applied to the joints while under pressure to locate any leaks. As in the other embodiments, all of the sealing areas can be tested and adjusted from the inside of the containment wall.

It should be understood that the size and specific shapes of the fittings may be varied to accommodate any size pipe and be used on either a flat or curved containment wall.

It will thus be seen that the present invention provides a new and useful flexible testable entry boot for sealing piping penetration in containment walls, particularly those associated with secondary containment systems and has a number of advantages and characteristics, including those pointed out herein and others which are inherent in the invention. Preferred embodiments of the invention have been described by way of example, and it is anticipated that modifications may be made to the described form without departing from the spirit of the invention or the scope of the appended claims.

I claim:

1. A pressure testable flexible piping penetration fitting comprising:
   a first elastomeric boot having a flange portion adapted to engage a first side of a containment wall and a body portion adapted to extend through an opening in said containment wall, said body portion further adapted to engage the outer diameter of a pipe extending through said opening;
   a second elastomeric boot adapted to overlap said body portion of first elastomeric boot and engage a second side of said containment wall opposite said first side to form an air pocket on said second side of said containment wall between said first and second elastomeric boots;
   a test port extending through said second elastomeric boot for pressurizing and monitoring said air pocket.

2. A pressure testable flexible piping penetration fitting comprising:
   a first elastomeric boot having a first flange portion adapted to engage a first side of a containment wall, said first elastomeric boot having a body portion adapted to extend through an opening in said containment wall and sealingly engage the outer diameter of a pipe extending through said containment wall;
   a second elastomeric boot having a second flange portion adapted to engage the opposite side of said containment wall and having a body portion adapted to overlap said body portion of said first elastomeric boot and sealingly engage said pipe to form an air pocket area;
   a test port extending through said second elastomeric boot for pressurizing and monitoring air pressure in said air pocket area;
   sandwich means for sandwiching said containment wall between said first elastomeric boot and said second elastomeric boot.

3. The pressure testable flexible piping penetration fitting of claim 2 wherein said test port includes means for attachment to an air pressure source and means for sealing said test port.

4. The pressure testable flexible piping penetration fitting of claim 2 wherein said sandwich means includes threadably engageable studs extending from said first elastomeric boot through said second elastomeric boot and held thereto by a plurality of nuts.

5. The pressure testable flexible piping penetration fitting of claim 2 wherein said first flange portion includes an encapsulated reinforcing ring.

6. A pressure testable flexible piping penetration fitting comprising:
   a first elastomeric boot having a first flange portion adapted to engage a first side of a containment wall defining a seal area, said first elastomeric boot having a body portion adapted to extend through an opening in said containment wall and engage the outer diameter of a pipe extending through said containment wall defining a seal area;
   a second elastomeric boot having a second flange portion adapted to engage the opposite side of said containment wall defining a seal area, said second elastomeric boot having a body portion adapted to overlap said body portion of said first elastomeric boot forming an air pocket area;
   a test port extending through said second elastomeric boot for pressurizing and monitoring air pressure in said air pocket area when said first and second elastomeric boots are assembled such that each of said seal areas may be tested and adjusted from one side of said containment wall.

7. The pressure testable flexible piping penetration fitting of claim 6 wherein said test port includes means for attachment to an air pressure source and means for sealing said test port.

8. The pressure testable flexible piping penetration fitting of claim 6 wherein said first flange portion includes a reinforcing ring.

9. A pressure testable flexible piping penetration fitting comprising:

a bulkhead having a flange portion for sealingly engaging one side of a containment wall and a body portion adapted to extend through an opening in said containment wall;

lock means for securing said bulkhead to said containment wall;

a first elastomeric boot adapted to overlap and sealingly engage said body portion of said bulkhead defining a seal area, said first elastomeric boot also adapted to sealingly engage an outer diameter of a pipe extending through said bulkhead and said opening in said containment wall defining a seal area;

a second elastomeric boot adapted to overlap both said body portion of said bulkhead and said first elastomeric boot to form an air pocket area such that one portion of said second elastomeric boot sealingly engages said outer diameter of said pipe defining a seal area and overlaps and sealingly engages said lock means defining a seal area, said first elastomeric boot and said second elastomeric boot cooperating to form an air pocket such that each of said seal areas may be tested and adjusted from one side of said containment wall;

a test port extending through said second elastomeric boot for pressuring and monitoring the pressure in said air pocket area.

10. The pressure testable flexible piping penetration fitting of claim 9 wherein said lock means includes a nut adapted to engage a threaded portion of said body portion of said bulkhead.

11. The pressure testable flexible piping penetration fitting of claim 9 wherein said first elastomeric boot includes a groove on said body portion adapted to receive a clamp for sealing said body portion to said outer diameter of said pipe.

12. The pressure testable flexible piping penetration fitting of claim 9 wherein said second elastomeric boot includes a first groove on one end for receiving a clamp for sealing said second boot to said lock means and a second groove on the other end for receiving a clamp to seal said second boot to said pipe.

* * * * *